(12) United States Patent
Davis et al.

(10) Patent No.: US 8,423,896 B2
(45) Date of Patent: Apr. 16, 2013

(54) GENERATING VECTOR GEOMETRY FROM RASTER INPUT FOR SEMI-AUTOMATIC LAND PLANNING

(75) Inventors: Mark Davis, Mill Valley, CA (US); Richard D. Howard, Kentfield, CA (US); Gene Roe, Hampton, NH (US)

(73) Assignee: Autodesk, Inc., San Rafael, CA (US)

( * ) Notice: Subject to any disclaimer, the term of this patent is extended or adjusted under 35 U.S.C. 154(b) by 822 days.

(21) Appl. No.: 11/948,858

(22) Filed: Nov. 30, 2007

(65) Prior Publication Data

US 2008/0282203 A1    Nov. 13, 2008

Related U.S. Application Data

(60) Provisional application No. 60/916,531, filed on May 7, 2007.

(51) Int. Cl.
*G06F 3/048* (2006.01)
(52) U.S. Cl.
USPC ........... 715/764; 715/964; 382/256; 382/282; 705/315
(58) Field of Classification Search .................. 715/964; 382/256, 282; 705/315
See application file for complete search history.

(56) References Cited

U.S. PATENT DOCUMENTS

| 5,835,386 | A | 11/1998 | Orr et al. | |
|---|---|---|---|---|
| 7,136,915 | B2 * | 11/2006 | Rieger, III | 709/223 |
| 7,395,191 | B2 * | 7/2008 | Detwiler et al. | 703/1 |
| 7,536,025 | B2 * | 5/2009 | Folchetti et al. | 382/100 |
| 2002/0010572 | A1 * | 1/2002 | Orton et al. | 703/22 |
| 2004/0260573 | A1 * | 12/2004 | Schmitt | 705/1 |
| 2005/0017967 | A1 | 1/2005 | Ratti et al. | |
| 2005/0049802 | A1 | 3/2005 | Minton, Jr. | |
| 2005/0114107 | A1 | 5/2005 | Putnam et al. | |
| 2006/0029275 | A1 * | 2/2006 | Li et al. | 382/173 |
| 2006/0105342 | A1 * | 5/2006 | Villena et al. | 435/6 |
| 2006/0294062 | A1 | 12/2006 | Folchetti et al. | |
| 2007/0016565 | A1 * | 1/2007 | Evans et al. | 707/3 |
| 2007/0078636 | A1 | 4/2007 | Elsberg et al. | |
| 2008/0052638 | A1 * | 2/2008 | Frank et al. | 715/808 |
| 2008/0059889 | A1 * | 3/2008 | Parker et al. | 715/748 |
| 2008/0130955 | A1 * | 6/2008 | Harrison et al. | 382/113 |

OTHER PUBLICATIONS

Parker et al, U.S. Appl. No. 60/841,540, filed Sep. 1, 2006.*
International Search Report, Aug. 29, 2008, PCT/US 06/52697.

* cited by examiner

*Primary Examiner* — Alvin Tan
(74) *Attorney, Agent, or Firm* — Patterson & Sheridan, LLP (57) ABSTRACT

One embodiment of the invention includes a land planning tool that maybe used to perform a variety of land planning tasks. The land planning tool may interpret global information systems (GIS) electronic data in conjunction with user-specified constraints to analyze and display a development site, visually indicating developable areas. The user may then use a pen-based device to sketch outlines of land planning objects. As the user sketches, the land planning tool may generate vector geometry stored in an electronic database for use by a variety of computer aided design tools.

21 Claims, 7 Drawing Sheets

GENERATING VECTOR GEOMETRY FROM RASTER INPUT FOR SEMI-AUTOMATIC LAND PLANNING

CROSS-REFERENCE TO RELATED APPLICATIONS

This application claims benefit of U.S. provisional patent application Ser. No. 60/916,531, filed on May 7, 2007, which is herein incorporated by reference.

BACKGROUND OF THE INVENTION

1. Field of the Invention

The present invention generally relates to computer software. More specifically, the present invention relates to a system and method for semi-automatic land planning.

2. Description of the Related Art

The term land planning generally refers to the process of allocating natural resources, such as land and water, for specific uses within a development project. The goal of the land planning process is typically to create a land development plan that maximizes return on investment, satisfies regulatory requirements, is sustainable, and at the same time, has adequate aesthetic qualities to attract people to the development. The land planning process often entails balancing a host of competing concerns including, for example, amount of free space versus amount of developed land; preservation of natural features such as existing streams, waterways, forestation, and wildlife habitats versus population density and land-use requirements; and the amount of space dedicated to commercial uses versus residential and recreational uses.

Currently, the land planning process is typically performed manually. For example, a land planner may use a topological relief map, a set of colored pencils, and trace paper. The land planner may overlay the trace paper on the topological relief map and then mark up the trace paper using the colored pencils to indicate portions of the natural resources the land planner proposes to be put to various uses, along with some basic proposals for locating infrastructure elements, such as roads. During this process, the land planner may use the topological relief map to determine attributes such as slope and aspect and incorporate this information into the proposed land development plan. The land planner may also use tools, such as a calculator and a spreadsheet, to determine and tabulate areas dedicated to a given use, such as commercial development and water areas. An engineer may then evaluate the proposed land development plan using separate hardware or software tools to ensure adherence with design criteria such as sustainability, environmental, economic, and regulatory constraints. After the engineer has approved the proposed land development plan, other stakeholders, such as the land-owners, design contractors, and community review boards, may review the plan.

If any of the stakeholders request a change to the proposed land development plan, the land planner may need to manually change the plan (again, using trace paper) and the engineer may need to evaluate this revised plan. The land planning process typically requires several iterations before a land development plan is approved. Once a land development plan is approved, the land planner may create and transmit the final paper land development plan to the design contractor. The design contractor may use this land development plan as the basis for more detailed design. Increasingly, design contractors use computer aided design (CAD) tools to efficiently generate and modify computer models, drawings, and other documentation related to development projects. To proceed with the development project, the design contractor may recreate the paper land development plan in an electronic form in a CAD tool.

One drawback to this approach to land planning is that it time consuming and expensive to create and accurately evaluate different land-use possibilities for a given development project. Moreover, if a stakeholder requests a change, the land planning process may need to be repeated at least once and perhaps multiple times. Another drawback to this approach is that the design contractor may need to recreate the land development plan in a CAD tool each time the design changes in order to efficiently perform the detailed design of the development project. Recreating the land development plan in this fashion is both error-prone and tedious.

As the foregoing illustrates, there remains a need in the art is a more effective and flexible technique for creating, evaluating, and communicating land development plans.

SUMMARY OF THE INVENTION

One embodiment of invention includes a method for a land planning tool to analyze a development site. This method may generally include receiving geographic information system (GIS) data describing the development site and retrieving one or more development constraints. The development constraints may specify, for example, a maximum slope that a given area of the development site may have to be included in the net buildable area, a project boundary surrounding the development site, or a minimum buffer surrounding a region of the development site excluded from the net buildable area. This method may generally further include determining a net buildable area of the development site, based on the GIS data and the one or more development constraints, generating a display of the development site, and presenting the display of the development site to a user. The display may highlight the net buildable areas of the development site, as determined from the GIS data and the development constraints. Advantageously, as the user interacts with the land planning tool, the tool may evaluate the user input in conjunction with the GIS and constraint data to provide real time feedback, thereby allowing the user to rapidly evaluate different land-use choices.

Another embodiment of the invention includes a method for processing raster input supplied to a land planning tool. This method may generally include generating a graphical display representing a development site, presenting the graphical display of the development site to a user, and receiving the raster input. The raster input may be drawn on the graphical display to specify a bounded region of the development site. For example, a touch sensitive screen or mouse cursor may be used. This method may also include generating vector geometry based on the raster input and associating the vector geometry with a land planning object. The vector geometry may describe a position and a shape of the bounded region of the development site, and the land planning object may represent a given land use. Once associated with the land planning object, the bounded region may be used to represent a portion of the development site to be dedicated to the given land use. The graphical display of the development site may be updated to include a representation of the vector geometry. Advantageously, providing real-time feedback as the user sketches on a display of the development site allows the user to rapidly evaluate different land-use choices. Furthermore, the land planning tool may store the vector geometries associated with the land planning objects as part of the land development plan in an electronic land planning database, thereby facilitating updates and communication with other CAD tools.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
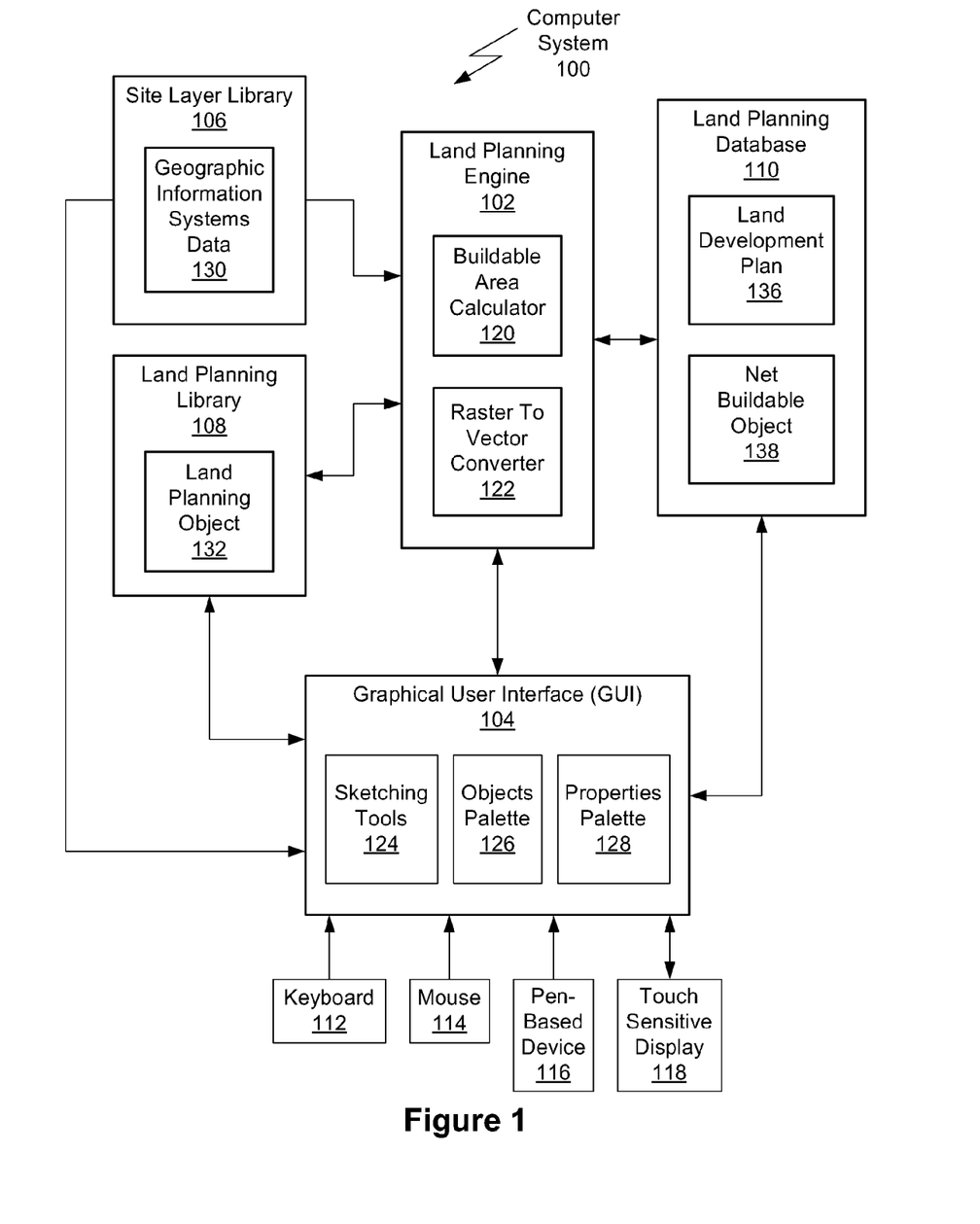
FIG. 1 is a conceptual illustration of a computer system in which embodiments of the invention may be implemented.

FIG. 1 is a conceptual illustration of a computer system 100 in which embodiments of the invention may be implemented. As described herein, computer system 100 may be configured to process user and data input, perform land planning calculations, and store and display land planning data related to a proposed development project. In one embodiment, the components illustrated in computer system 100 include computer software applications executing on existing computer systems, e.g., desktop computers, server computers, laptop computers, tablet computers, PDAs or other mobile computing devices, and the like. The software applications described herein, however, are not limited to any particular computing system and may be adapted to take advantage of new computing systems as they become available.

Additionally, the components illustrated in computer system 100 may be software applications executing on distributed systems communicating over computer networks including local area networks or large, wide area networks, such as the Internet. For example, a graphical user interface (GUI) 104 may include a software program executing on a client computer system communicating with a land planning engine 102 executing on a server computer system. Also, in one embodiment, the land planning engine 102 and the GUI 104 may be provided as an application program (or programs) stored on computer readable media such as a CD-ROM, DVD-ROM, flash memory module, or other tangible storage media.

As shown, the computer system 100 includes, without limitation, the GUI 104, the land planning engine 102, a keyboard 112, a mouse 114, a pen-based device 116, a touch sensitive display 118, a site layer library 106, a land planning library 108, and a land planning database 110. The GUI 104 may be configured to allow users to interact with the land planning engine 120 via the keyboard 112, the mouse 114, the pen-based device 116, and the touch sensitive display 118. The land planning engine 102 may process user input transmitted from the GUI 104 in conjunction with information from the site layer library 106 and the land planning library 108 to generate, modify, evaluate, and display development sites, land development plans, and associated data. Further, the land planning engine 102 may be configured to allow users to store land planning information in the land planning database 110.

In one embodiment, the site layer library 106 is configured to import and process geographic information systems (GIS) data 130. The GIS data 130 may include a variety of information stored in standard GIS file formats. For example, the Geography Markup Language (GML) provides an open standard for GIS data exchange. Of course, embodiments of the invention may be adapted for use with a wide variety of GIS data and/or file formats. However, formatted, the GIS data 130 may include layers representing satellite imagery, CAD files defining property boundaries, three dimensional digital elevation models for surface and contour data, soils analysis data, toxicity data, and the like. The land planning engine 102 and the GUI 104 may be configured to read, analyze, and display the GIS data 130 throughout the land planning process.

As shown, the land planning engine 102 includes a buildable area calculator 120. After the land planning engine 102 parses the GIS data 130, the buildable area calculator 120 may interpret selected site layers in conjunction with user-defined constraints to calculate a net buildable area of the development site represented by the GIS data 130. The net buildable area represents the total geographic area of the development suite suitable for development, based on the characteristics of the site, as represented by the GIS data 130, and development constraints supplied to the land planning engine 102 by a user. The land planning engine 102 may organize data related to the development site and the land planning process in any number of data layers. For example, data layers may be used to represent areas of a proposed development that are buildable, not buildable, designated as wetlands, as open space, or as being polluted in some way, etc, based on the GIS data 130 and the user-specified development constraints.

The buildable area calculator 120 may then use the net buildable data to update the properties of a net buildable object 138. The net buildable object 138 may be a programmatic object configured to store and report on properties of the development site such as net buildable area, net not buildable area, wet lands, hazardous area, open space area, and the like. Furthermore, the net buildable object 138 may be configured to store properties representing a set of constraints used to evaluate the GIS data and determine the net buildable area. For example, a constraint may specify a buffer of undevelopable area around wet lands or a maximum topographical slope an area of the development site may have to be considered buildable (or not buildable). As the user adjusts constraints associated with selected site layers, the buildable area calculator 120 may be configured to automatically recalculate the net buildable data and update the properties of the net buildable object 138. For example, the net buildable area calculator 120 may interpret a site layer representing toxic land and apply a user-defined buffer around any toxic land, thereby reducing the net buildable area. If the user then changes the size of the buffer, then the net buildable area calculator 120 may update the net buildable area of the development site, accordingly. The buildable area calculator 120 may perform the site analysis and buildable area calculations in any technically feasible fashion.

In one embodiment, the land planning library 108 may also include one or more land planning objects 132 associated with a given development plan. Each land planning object 132 may be used to represent a different type of land-use, such as commercial, residential, and mixed-use, or represent different infrastructure elements, such as roads, bridges, etc. That is, each land planning object 132 may represent a region of the development site to be generally dedicated to a given use. Each land planning object 132 may include properties and imbedded behavior defining how the land planning engine 102 and the GUI 104 interpret and interact with the land planning object 132. Further, each land planning object 132 may be associated with one or more vector geometries. The vector geometry for a given land planning object 132 may define a region of the development site "covered" by that land planning object 132. By intersecting the area of the development site covered by a given land planning object with the net buildable area, the land planning engine 102 may report on how much space is available for the proposed use associated with the land planning object 132.

The vector geometry associated with a given land planning object 132 may inherit a subset of the properties and imbedded behavior of the land planning object 132. For example, a land planning object 132 instantiated to represent a road may include properties such as number of lanes, material, traffic flow, shoulder width, type of guardrail, and the like. Furthermore, a land planning object representing a road may include imbedded behavior that the land planning engine 102 applies to the vector geometry of the road land planning object, such as to display the geometry of the road land planning object using a line and to detect undesirable actions such as a user attempting to draw a portion of roadway over water or placing a multi-lane highway through the middle of a residential subdivision. Similarly, for a land planning object representing a region of a development site to be generally dedicated to residential housing, the corresponding land planning object may include vector geometry defining the boundary of the region and data related to the net buildable area relative to residential housing, e.g., lot size, setbacks, density, etc. In one embodiment, the land planning object 132 may be created and edited by various CAD tools, including the land planning engine 102 and the GUI 104.

Also as shown, the GUI 104 includes sketching tools 124, an objects palette 126, and a properties palette 128. The sketching tools 124 may be configured to allow the user to input raster data using the pen-based device 116 in conjunction with the touch sensitive display 118. Generally, the raster data refers to a collection of pixels, or points of color, viewable on a display screen. The raster data describes the collection of pixels "drawn" on the display image by the user with sketching tools 124. Alternatively, a mouse 114 and screen cursor may be used to input raster data, e.g., by "drawing" on the image of the development site using a mouse and mouse cursor. In one embodiment, the GUI 104 and the land planning engine 102 may display selected site layers, such as an aerial view of the development site, and selected land planning objects 132 on the touch sensitive display 118 while the user inputs raster data using the pen-based device 116. Further, the sketching tools 124 may display the input raster data in real-time, thereby allowing the user to "draw" directly upon visual images, such as an aerial view. The GUI 104 may transmit the raster input to the land planning engine 102 for further processing.

In one embodiment, the objects palette 126 may be a graphical window used to select, modify, and display selected site layers, properties of the net buildable object 138, and properties of the land planning objects 132. Similarly, the properties palette 128 may be a graphical window that allows the user to interact with the properties of a selected object such as a site layer, the net buildable object 138, one of the land planning objects 132, or a vector geometry. Although objects may be selected using the objects palette 126, objects may also be selected in a variety of other methods using the keyboard 112, the mouse 114, the pen-based device 116, and the touch sensitive display 118. Furthermore, those skilled in the art will recognize that the components shown in FIG. 1 are simplified to highlight aspects of the present invention and that the GUI 104 may include a broad variety of additional tools and features used to compose and manage the site layer library 106, the land planning library 108, and the land planning database 110.

The land planning engine 102 may also include a raster-to-vector converter 122. The raster-to-vector converter 122 may be configured to receive raster input from the GUI 104 and converts this raster input into vector geometry. Vector geometry models the raster input using geometrical primitives such as points, lines, curves, and polygons. In contrast to the raster input, which represents the user input as a collection of pixels, the vector geometry may be manipulated by the land planning engine in a variety of ways. Advantageously, for example, the land planning engine 102 may operate in conjunction with the GUI 104 to allow the user to manipulate vector geometry using standard CAD-like grip editing and direct shape manipulation. Typically, the raster input is associated with one of the land planning objects 132. In such a scenario, the land planning engine 102 may also associate the vector geometry generated by the raster-to-vector converter 122 with one of the land planning objects 132. The vector geometry may then be manipulated by using the CAD-like editing capabilities of the GUI 104 as well as by using the properties palette 128 for the associated land planning object 132. As vector geometries are added, the land planning engine 102 may store these vector geometries in the land planning database 110.

Also as shown, the land planning database 110 includes the net buildable object 138 and a land development plan 136. The net buildable object 138, as discussed above, may include data from the site analysis phase of the land planning process. The land development plan 136 may indicate portions of the site to be put to various uses, along with the location of some infrastructure elements. In one embodiment, the land planning engine 102 may generate the land development plan 136 using the vector geometries associated with the land planning objects 132. The land planning database 110 may also include supplementary land planning data such as land planning reports, alternative proposals for land development, and the like. The land planning engine 102 may be configured to both read from and write to the land planning database 110, thereby facilitating easy updates to the land development plan 136.

Figure 2:
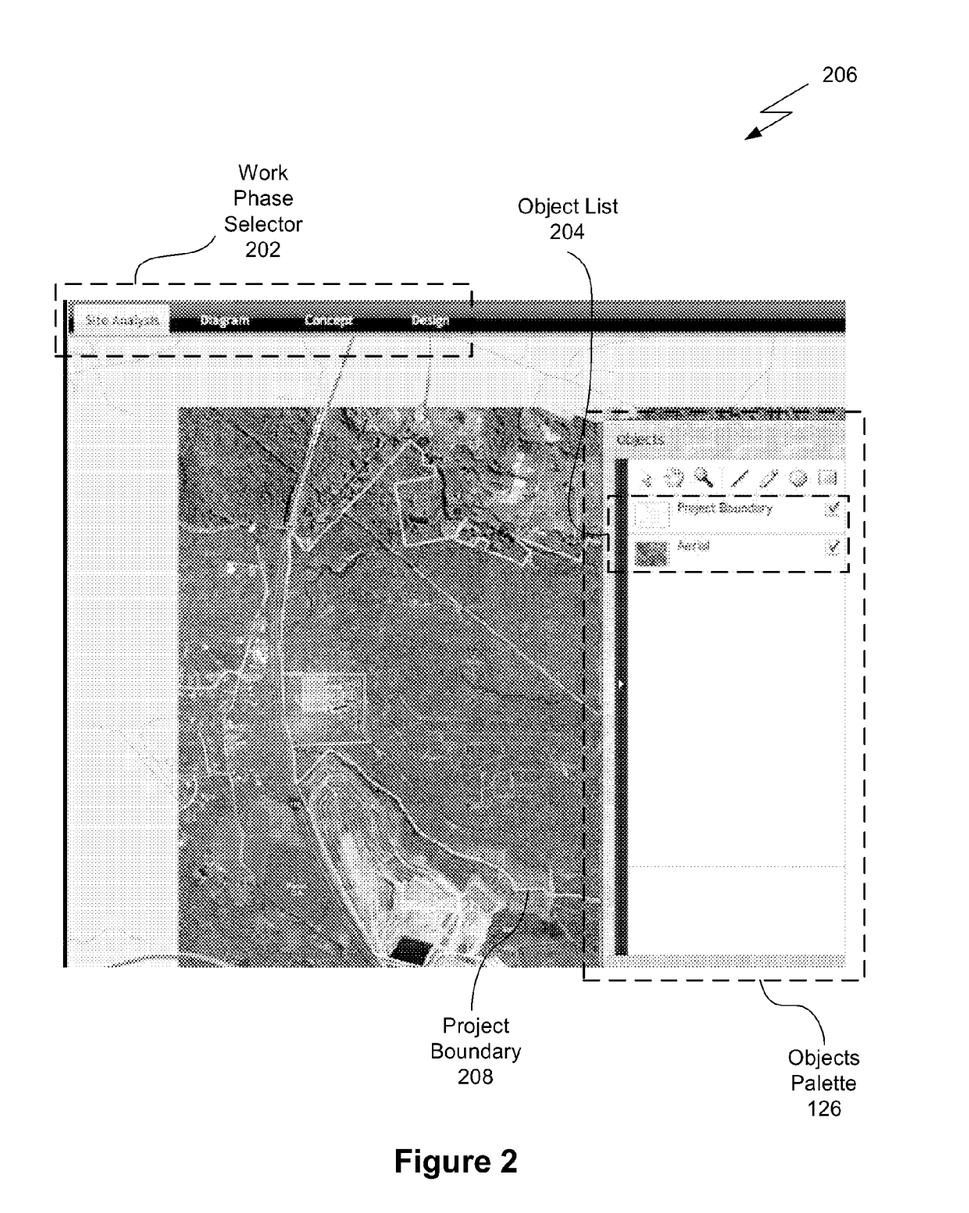
FIG. 2 illustrates an exemplary screen display of the graphical user interface of FIG. 1 in a site analysis phase of the land planning process, according to one embodiment of the invention.

FIG. 2 illustrates an exemplary screen display 206 of the graphical user interface 104 of FIG. 1 in a site analysis phase of the land planning process, according to one embodiment of the invention. As shown, the GUI 104 includes a work phase selector 202, an objects palette 126, an object list 204, and a project boundary 208.

During the land planning process, the user may continuously refine the land planning data, typically adding more detail. The work phase selector 202 allows the user to configure the GUI 104 and the land planning engine 102 to operate in a specific mode that corresponds to a land planning phase that the user is currently performing. In the screen display 206 illustrated in FIG. 2, there are four different work phases: site analysis, diagram, concept, and design.

In this example, as shown by the work phase selector 202, the site analysis work phase is selected. Each of these work phases may represent a successively more detailed phase of the land planning process, each with a different objective. For example, the objective of the site analysis phase may be to determine the net buildable area and the objective of the diagram phase may be to obtain a rough estimate of the cost of the development versus the potential profit by creating an initial version of the land development plan 136. In other embodiments, the GUI 104 and the land planning engine 102 may provide any amount and types of work phases. The land planning objects 132 may include different imbedded behavior for different work phases, and the land planning engine 102 may select and apply the behavior corresponding to the current work phase. For example, an instance of the land planning object 132 corresponding to residential land-use may be unavailable in the site analysis work phase, be represented by a circular bubble in the diagram work phase, be represented by a set of blocks in the concept work phase, and be represented by individual lots in the design work phase. Advantageously, the user may proceed back-and-forth between the work phases, and the land planning engine 102 will automatically display the selected land planning data in the appropriate format.

As shown in FIG. 2, the objects palette 126 includes the object list 204. Since the site analysis phase is selected, the objects palette 126 may display a subset of objects that are appropriate for the site analysis phase of the land planning process. Illustratively, the object list 204 includes a project boundary object and an aerial object. As also shown, screen display 206 presents a user with both the corresponding project boundary 208 and the corresponding aerial image. As the name implies, the project boundary 208 represents the boundary of the development site, and calculations related to net buildable area, and land planning objects are constrained to land within project boundary 208.

Figure 3:
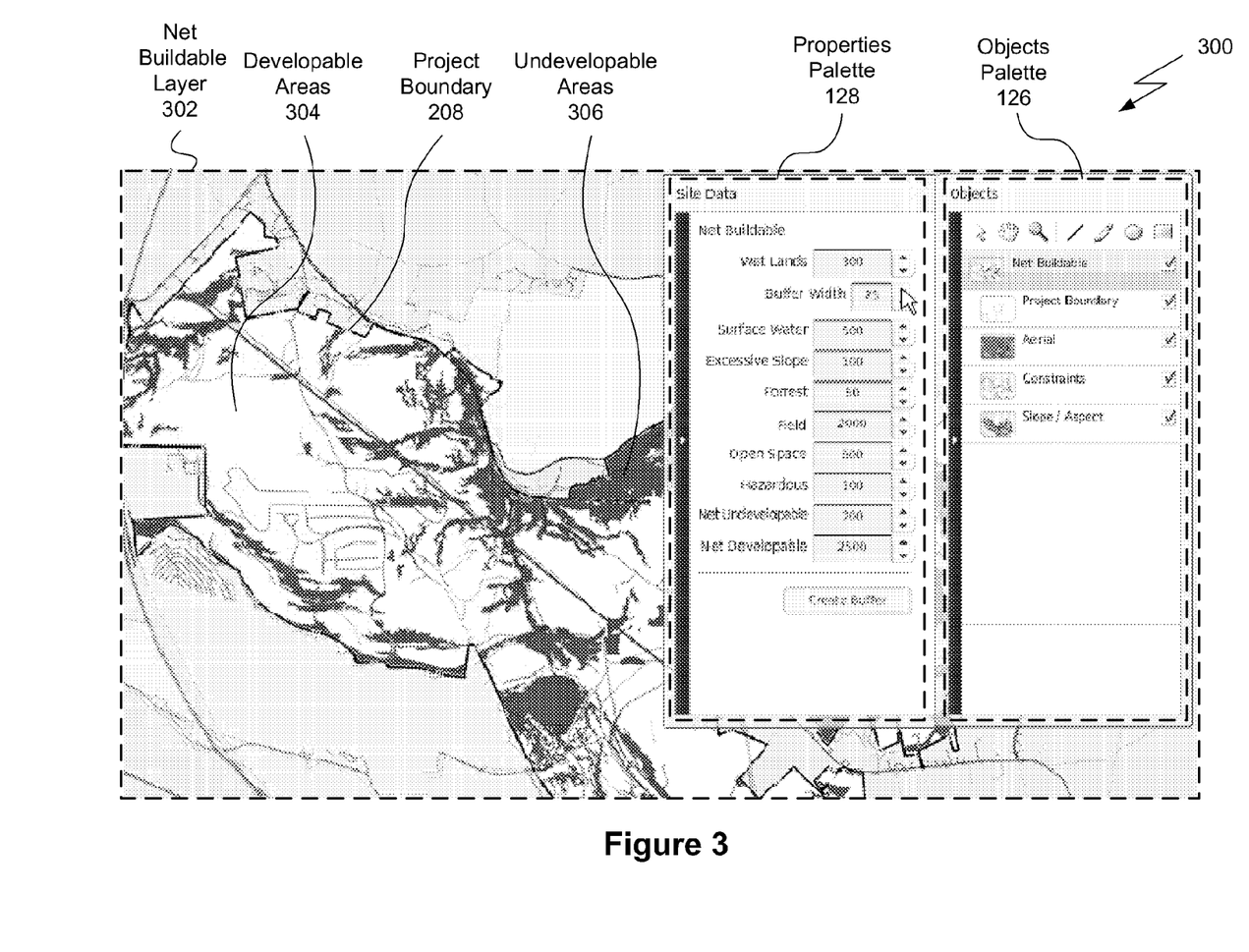
FIG. 3 illustrates another exemplary screen display of the graphical user interface of FIG. 1 in the site analysis phase of the land planning process, according to one embodiment of the invention.

FIG. 3 illustrates an exemplary screen display 300 of the graphical user interface 104 of FIG. 1 in the site analysis phase of the land planning process, according to one embodiment of the invention. In this example, the screen display 300 includes the objects palette 126, the properties palette 128, the project boundary 208, and a net buildable layer 302. As shown, the objects palette 126 includes the net buildable object 138 and site layers corresponding to GIS data 130, such as constraints and slope/aspect. Illustratively, the net buildable object 138 is selected and the properties palette 128 displays the properties of the net buildable object 138. Furthermore, the screen display 300 presents the net buildable layer 302 associated with the net buildable object 138. The net buildable layer 302 includes a region of developable areas 304, displayed in white, and a region of undevelopable areas 306, displayed as a dark color. The project boundary 208 is also displayed, and constrains the developable areas 304.

In one embodiment, as the user adjusts the constraints in the properties palette 128, other properties in the properties palette 128 may adjust automatically. For example, in the specific screen display 300 shown in FIG. 3, the properties palette 128 shows that areas designated as wet lands in the GIS data 130 are configured to have a buffer width of seventy-five feet. If the user increases this buffer width, the buildable area calculator 120 may recalculate the properties of the net buildable object 138. In such a case, the value of the net undevelopable property, shown to be seven hundred, would increase; the value of the net developable property, shown to be two thousand five hundred, would decrease. At the same time, the visual display of the developable and undevelopable areas would also change accordingly. Thus, the size of the white areas, corresponding to the developable areas 304, would decrease; and the size of the colored areas, corresponding to the undevelopable areas 306, would increase. Similarly, the user may modify other properties and constraints, and the buildable area calculator 120 may recalculate and redisplay the net buildable object 138 automatically. Furthermore, the user may add or remove site layers from the buildable area calculations by selecting or deselecting the site layers in the object palette 126. Again, the buildable area calculator 120 may recalculate and redisplay the net buildable object 138 using only the selected site layers and corresponding constraints.

Figure 4:
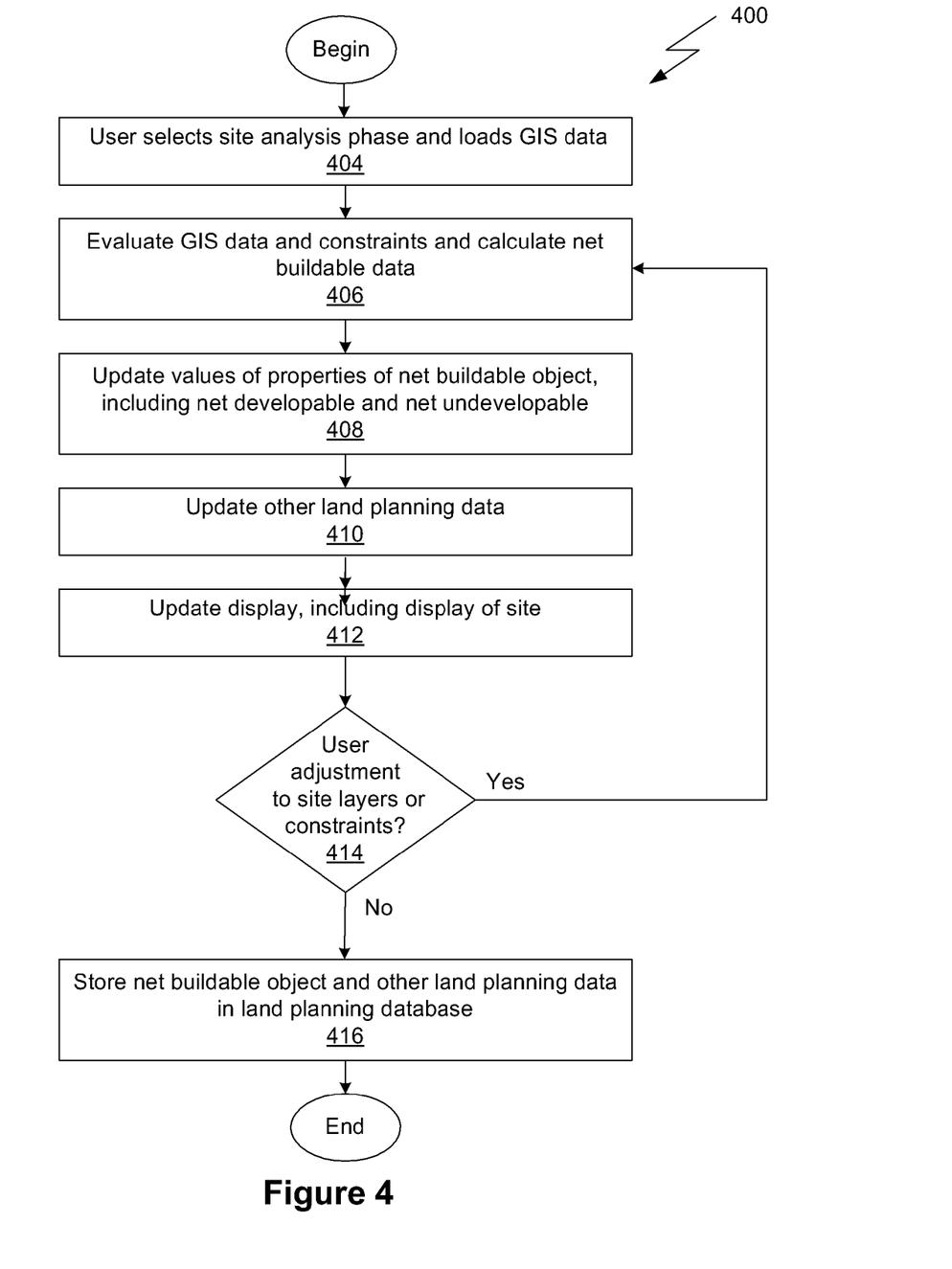
FIG. 4 is a flow diagram illustrating a method for performing a site analysis, according to one embodiment of the invention.

FIG. 4 is a flow diagram illustrating a method 400 for performing a site analysis, according to one embodiment of the invention. Although the method steps are described in conjunction with the systems for FIGS. 1-3, persons skilled in the art will understand that any system that performs the method steps, in any order, is within the scope of the invention.

As shown, the method 400 begins at step 404, where the user selects the site analysis phase using the work phase selector 202 of FIG. 2. Additionally, the user may specify the GIS data 130 associated with a given land planning product using the GUI 104. In response, the land planning engine 102 may load the GIS data 130 and generate an initial display of the development site. For example, the land planning engine may generate an aerial display of the development, as well as create and display a project boundary defining the development site of a given development project. At step 406, the buildable area calculator 120 may evaluate the site layers corresponding to the GIS data 130 in conjunction with any user-specified constraints and calculate the net buildable area of the development site. The buildable area calculator 120 may calculate the net buildable data in any technically feasible manner.

At step 408, the buildable area calculator 120 may update site properties of the net buildable object 138, such as a net undevelopable area and corresponding net developable area. At step 410, the land planning engine 102 may update any other affected land planning data, such as site analysis reports. At step 412, the land planning engine 102 may update the display of the development site presented to the user. For example, the screen display 300 of FIG. 3 illustrates a display of the net buildable layer where 302, where the developable areas are shown the in white and undevelopable areas are displayed using a dark color. If the user has selected to include a display of the net buildable object 138, then a display of the net buildable layer 302 is updated. Also, any other information displayed on the touch sensitive display 118 may also be updated. For example, if the properties palette 128 for the net buildable object 138 is displayed on the touch sensitive display 118, the values shown in the properties palette 128 may be updated at step 412.

At step 414, the land planning engine 102 may process any user adjustments to the site layers or the constraints entered using GUI 104. User adjustments may include the input of additional GIS data 130; the inclusion or exclusion of a site layer from consideration during site analysis; a change in the value of a constraint, such as maximum buildable slope; and the like. If there are any user adjustments, then the method 400 returns to step 406, where the buildable area calculator 120 evaluates any changes and, if necessary, recalculates the net buildable data. In one embodiment, land planning engine 102 may continue to perform steps 406 through 414, processing any user adjustments and automatically recalculating the net buildable data, until there are no more user adjustments. If, at step 414, there are no user adjustments, then at step 416, the land planning engine 102 stores the net buildable object 138 and other data generated during the site analysis, in the land planning database 110, and the method 400 terminates.

Figure 5:
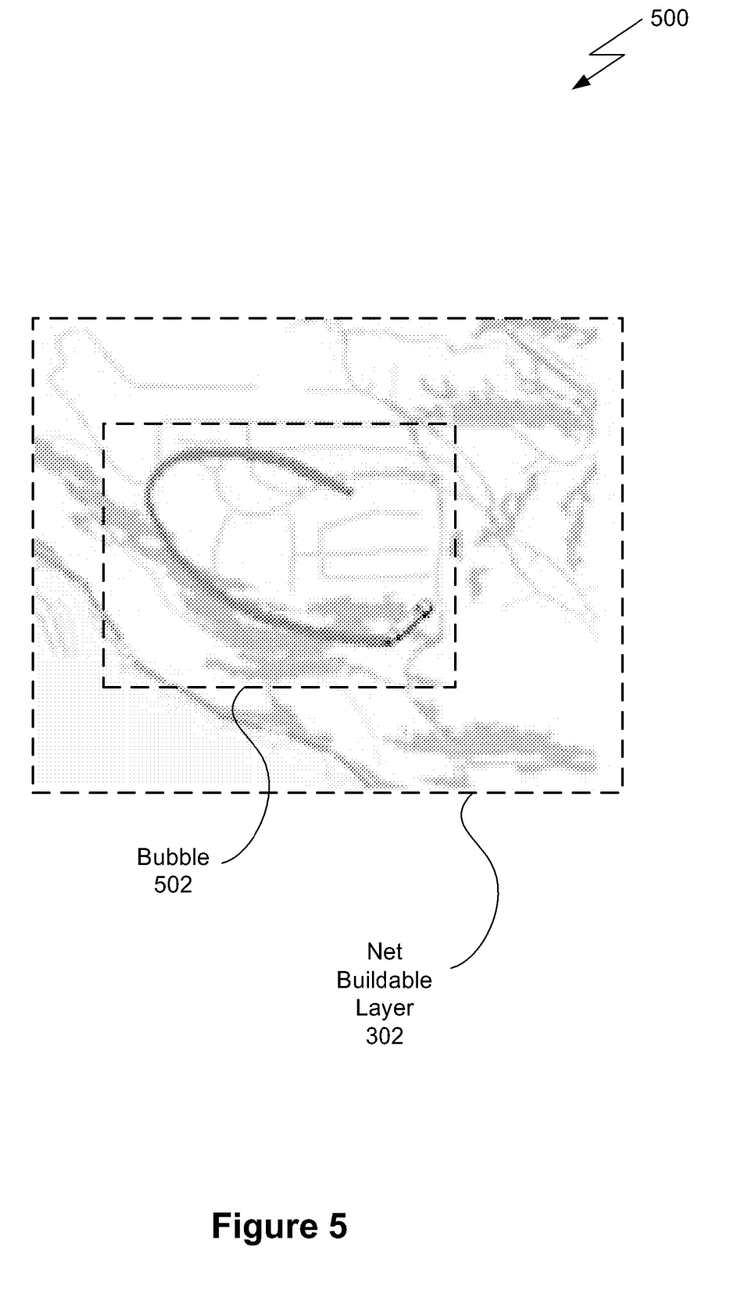
FIG. 5 illustrates an exemplary screen display of the graphical user interface of FIG. 1 in a diagram phase of the land planning process, according to one embodiment of the invention.
Figure 6:
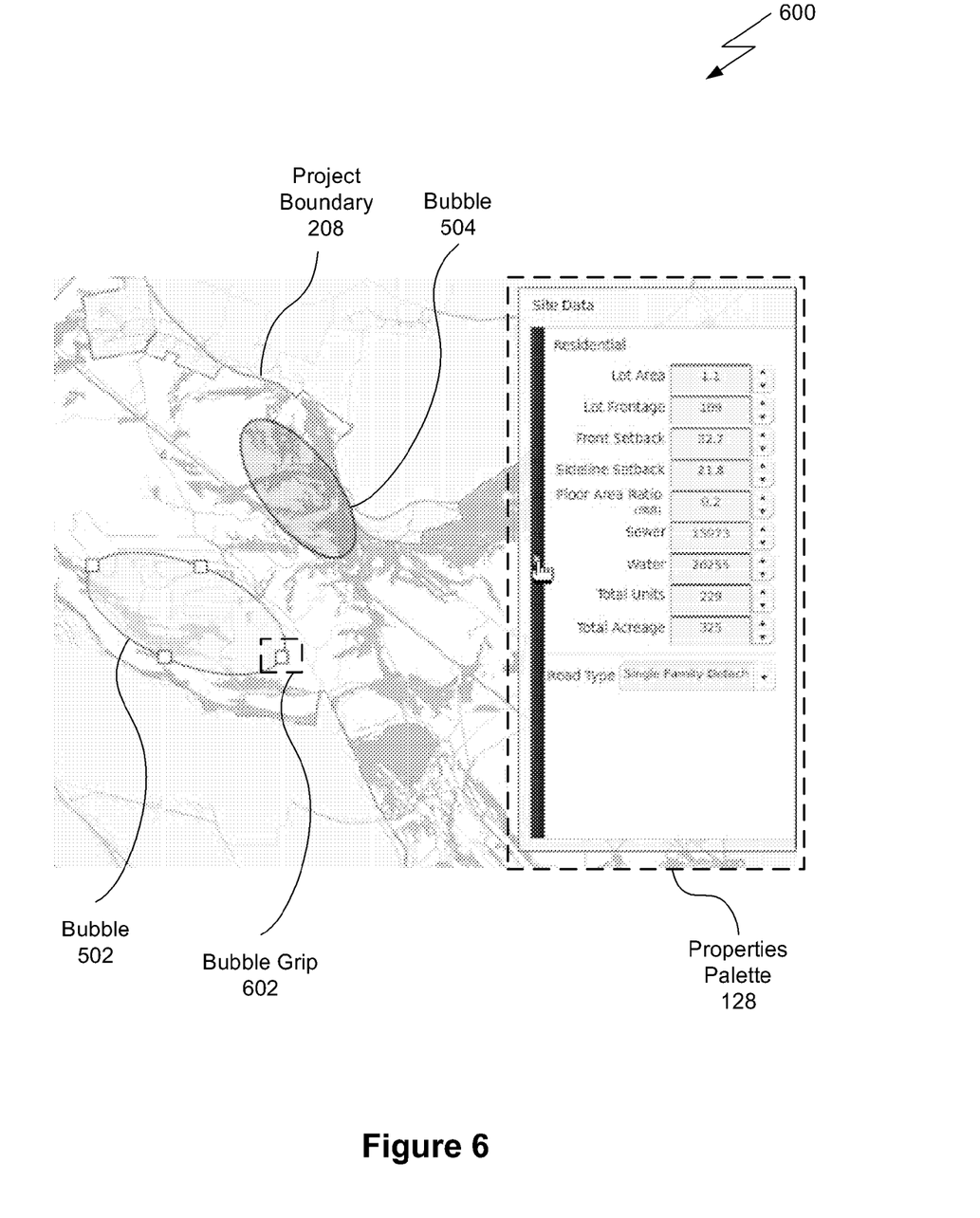
FIG. 6 illustrates another exemplary screen display of the graphical user interface of FIG. 1 in the diagram phase of the land planning process, according to one embodiment of the invention.

FIGS. 5 and 6 show exemplary screen shots of the GUI 104 being used in a diagram phase of the land planning process, according to one embodiment of the invention. During the diagram phase, a land planner may draw simple geometric figures on the GUI display of a development site, referred to herein as bubbles. Each bubble may be used to represent a portion of the development site to generally be dedicated to a given land use. The bubbles may be drawn using a touch sensitive screen 118 or using a mouse cursor. Further, the land planning engine 102 may be configured to determine the area of the development site "covered" by a particular bubble and update the project data accordingly. For example, when a user draws a bubble representing an area of the development site to be used for residential housing, a corresponding land planning object 132 may be updated to include the additional area "covered" by the bubble.

Further, the land planning engine may be configured to generate vector geometry representing the bubble that may be edited using CAD grip editing tools, stored as part of one of the land planning objects 132, and recreated on the GUI 104. For example, once drawn by a user, the bubbles may be edited, moved, or deleted, and the project data may be updated accordingly. Converting the hand-drawn raster input into vector geometry may allow the user to rapidly evaluate a variety of planning scenarios for a given development site. In one embodiment, each bubble may be associated with a set of graphical properties, e.g., vector geometry defining the shape of bubble. Also, each bubble may be associated with a set of properties related to a particular land use. Such properties may be used in conduction with the net buildable area to evaluate the impact of different land planning choices. For example, a bubble representing a land use of a recreational golf course may have properties representing estimated water use, development and maintenance costs, etc, where a bubble representing a land use of single family housing may have properties representing setback requirements, number of units contributed to the development plan by a given bubble, etc.

In FIGS. 5 and 6, the work phase selector 202 of FIG. 2 has been changed from the site analysis phase to the diagram phase (not shown) of the land planning process. In response, the land planning engine 102 may configure the objects palette 126 to display a list of land planning objects 132 that correspond to various infrastructure elements, such as roads, and various land-uses, such as residential, industrial, civic, etc.

FIG. 5 illustrates an exemplary screen display 500 of the graphical user interface of FIG. 1 in a diagram phase of the land planning process, according to one embodiment of the invention. In this example, the land planning engine 102 has completed a site analysis, and the buildable area calculator 120 has generated the net buildable layer 302 using the method 400 of FIG. 4. As shown, the screen display 500 includes a visual representation of a portion of the net buildable layer 302 of FIG. 3 and a bubble 502 in the process of being drawn by the user. As the user supplies the raster based input, the screen display changes as if being drawn on with a pen. For example, the use may interact with the sketching tools 124 to enter raster data by drawing with the pen-based device 116 on the touch sensitive display 118. In this example, the touch sensitive display 118 also shows the net buildable layer 302. The user is entering the bubble 502, which the touch sensitive display 118 may display in realtime. The bubble 502 may be any shape that outlines and, thereby, defines an area of the development site.

FIG. 6 illustrates another exemplary screen display 600 of the graphical user interface of FIG. 1 in the diagram phase of the land planning process, according to one embodiment of the invention. As shown, the screen display includes the project boundary 208, the bubble 502, a second bubble 504, and the properties palette 128. As stated, in the diagram phase, the GUI 104 may be configured to allow the user to input raster data within the project boundary 208, thereby creating vector geometries associated with the land planning objects 132.

Illustratively, the user has completed entering bubble 502 and the raster-to-vector converter 122 has converted the raster input defining bubble 502 to vector geometry. In one embodiment, the user may associate the bubble 502 with any of the land planning objects 132 using the editing capabilities of the GUI 104. Assume for this example that the user has associated the bubble 502 with a land planning object representing residential land-use. That is, the bubble 502 may represent an area proposed to generally be dedicated to residential land-use. Advantageously, since the raster-to-vector converter 122 has created a vector geometry version of the bubble 502, the bubble 502 may be manipulated using the CAD-like editing capabilities of the GUI 104. For example, the user may resize and reshape the bubble 502 using a bubble grip 602. Furthermore, the land planning engine 102 may update the properties of the residential land planning object dynamically, such as lot area, lot frontage, and the overall project statistics that result from changing the area of the development site "covered" by bubble 502, and thus, the area to generally be dedicated to residential use. Similarly, as the user adjusts the properties of the residential land planning object using the properties palette 128, the land planning engine 102 may dynamically update the associated vector geometries, such as the bubble 502. This bi-directional data flow provides the user with real-time visual feedback on the impact of land-use choices.

As shown, the properties palette 128 displays the properties of a residential land planning object. In this case, the values in the properties palette 128 correspond to the net buildable area of the development site "covered" by the vector geometry associated with the residential land planning object. In one embodiment, when the values in the properties palette 128 are altered, the land planning engine 102 may dynamically update all the vector geometry associated with the residential land planning object. For example, if the value of "total units" is doubled, the land planning engine 102 may double the size of the vector geometry associated with the residential land planning object. That is, the size of the bubble 502 may be increased to accommodate the user's requested change in "total units." Alternatively, the land planning engine 102 may reduce the total number of lots calculated for the development site in response to the residential land planning object. Similarly, if the vector geometry associated with the residential land planning object change is changed using bubble grip 602, the land planning engine 102 may update the total values in the properties palette 128.

Figure 7:
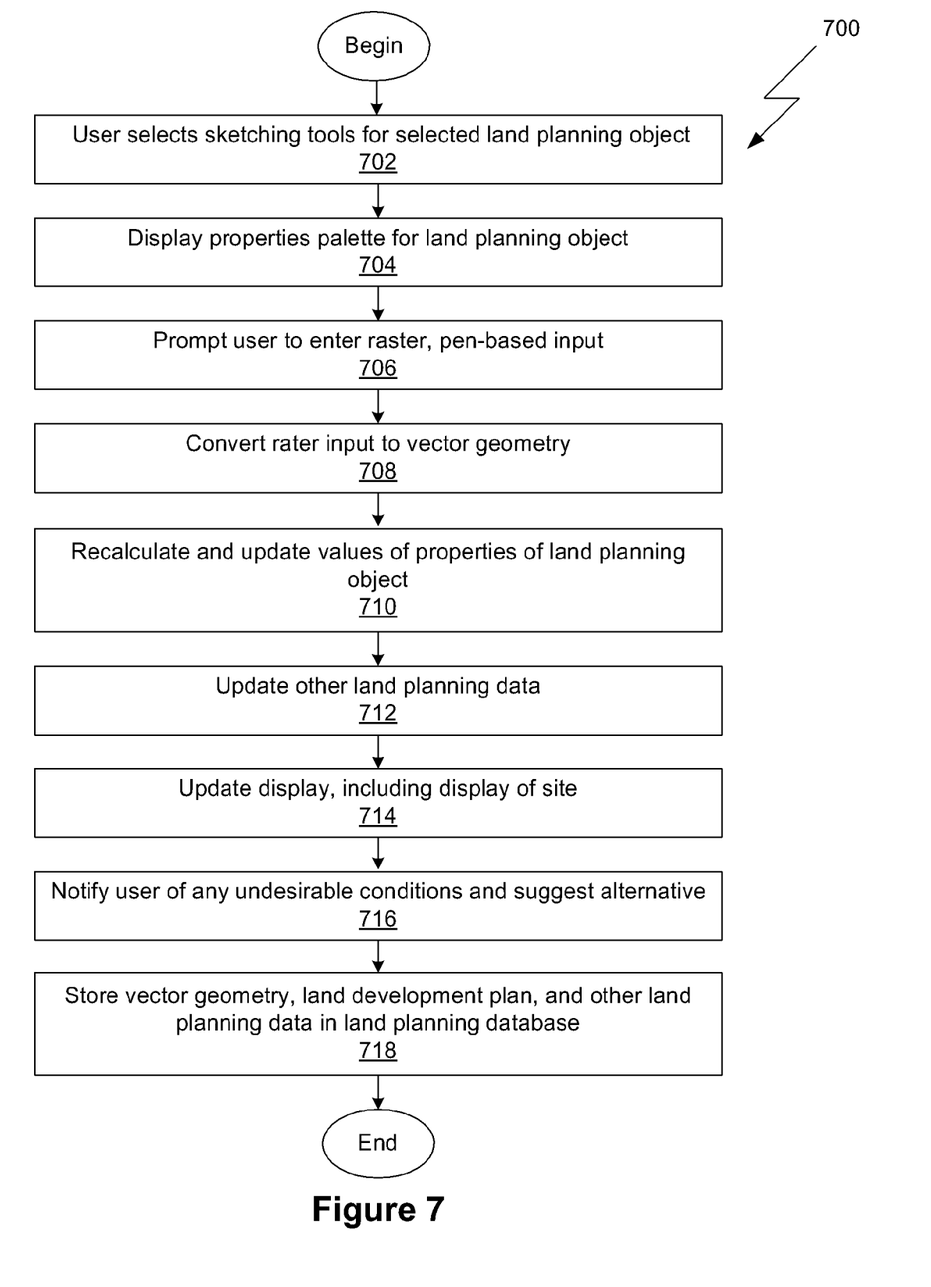
FIG. 7 is a flow diagram illustrating a method for processing raster input, according to one embodiment of the invention.

FIG. 7 is a flow diagram illustrating a method for processing raster input, according to one embodiment of the invention. Although the method steps are described in conjunction with the systems for FIGS. 1-3 and FIGS. 5-6, persons skilled in the art will understand that any system that performs the method steps, in any order, is within the scope of the invention.

As shown, the method 700 begins at step 702, where the user selects the sketching tools 124 for a selected land planning object 132. In step 704, the land planning engine 102 may display the properties palette 128 for the selected land planning object 132. At step 706, the GUI 104 may prompt the user to define a bubble "covering" some portion of the development site. The user input may be raster, pen-based input supplied using a touch-sensitive screen or drawn by moving a mouse cursor. At step 708, the raster-to-vector converter 122 may convert the raster input to vector geometry.

At step 710, the land planning engine 102 may update the selected land planning object 132 to include the vector geometry created at step 708. Additionally, the properties of the selected land planning object 132 may be updated to reflect the additional area of the development site "covered' by the vector geometry created at step 708. At step 712, the land planning engine 102 may update any other affected land planning data, such as the land development plan 136. At step 714, the land planning engine 102 updates the display of the development site shown on the display 118. As part of step 714, the display of the raster input entered in step 706 may be replaced with a display of the corresponding vector geometry generated in step 708.

Also, other information displayed on the display 118 may be updated. For example, the values shown in the properties palette 128 for the selected land planning object 132 may be updated based on the area of the development site "covered" by the bubble. At step 716, the land planning engine 102 evaluates the embedded behavior of the selected land planning object 132 to determine whether the new vector geometry for undesirable conditions, such as a road over water. If such an undesirable condition exists, the land planning engine 102 may use the information in the selected land planning object 132 to suggest an alternative, such as to use a bridge instead of a road. At step 718, the land planning engine 102 stores the vector geometry, the land development plan 136, and any other land planning data generated during the execution of the method 700, in the land planning database 110, and the method 700 terminates.

In sum, GIS data may be analyzed and used to calculate net buildable data, such as developable areas and undevelopable areas of a development site, as part of the land planning process. In one embodiment, a land planning tool may parse GIS data; analyze selected GIS data in conjunction with user constraints; calculate net buildable data; and visually display selected GIS data, user constraints, calculated net buildable data, or any combination thereof. As the user adjusts the GIS data to be included in the net buildable calculations, the land planning tool automatically reanalyzes the GIS data and updates the net buildable data on-the-fly. Similarly, as the user adjusts the constraints applied to the GIS data, such as the maximum slope that may be developed, the land planning tool automatically reanalyzes the GIS data and updates the net buildable data on-the-fly. The land planning tool may display the updated net buildable data in a variety of formats including a two dimensional map projection, data spreadsheets and tables, and the like. Advantageously, automatically calculating the net buildable data reduces both the likelihood of errors and the time required to perform the initial phases of the land planning process. Furthermore, providing real-time net buildable data allows the user to quickly and accurately evaluate the impact of various constraints on the potential development of a given development site.

Further, in one embodiment, once the initial net buildable area of a development site is determined, the user may refine the development plan by specifying areas of the development site to generally be dedicated to a given use. For example, the user may supply raster, pen-based input to define outlines of land planning objects as part of the land planning process. In one embodiment, a computer system is configured to include a land planning tool, a touch sensitive display, and a pen-based device. The land planning tool displays a map of a development site and selected site data, such as developable area, on the touch sensitive display. The user may then use a pen-based device to sketch outlines of land planning objects. Each land planning object may represent a different land use such as residential development, commercial, mixed use, or infrastructure. As the user sketches, the land planning tool may convert the raster input to vector geometry and associate the vector geometry with a land planning object. After the land planning tool creates vector geometry associated with a land planning object, the vector geometry may be modified using CAD-like grip editing tools or using the properties palette of the associated land planning object.

Each land planning object may be configured to include properties and embedded behavior. Furthermore, the vector geometry associated with a land planning object may inherit the properties and behavior of the land planning object. Therefore, as a vector geometry corresponding to a land planning object is created or modified, the land planning tool may automatically analyze the vector geometry to determine, calculate, and display properties, such as volume, area, number of units, and cost. Additionally, the embedded behavior of the land planning object may configure the land planning tool to analyze the vector geometry with respect to the other vector geometry in the land development plan, site data, and constraint data, flagging undesirable circumstances and, possibly, suggesting alternatives.

Advantageously, providing real-time feedback as the user sketches on a display of the development site may allow the user to rapidly evaluate many different land-use choices. Furthermore, the land planning tool may store the vector geometries associated with the land planning objects as part of the land development plan in an electronic land planning database, thereby facilitating updates and communication with other CAD tools.

While the foregoing is directed to embodiments of the present invention, other and further embodiments of the invention may be devised without departing from the basic scope thereof, and the scope thereof is determined by the claims that follow.

We claim:

1. A method for processing raster input supplied to a land planning tool, comprising:
    generating a graphical display representing a development site;
    presenting the graphical display of the development site to a user;
    receiving the raster input, wherein the raster input is drawn on the graphical display to specify a bounded region of the development site;
    generating vector geometry based on the raster input, wherein the vector geometry describes a position and a shape of the bounded region of the development site;

associating the vector geometry with a land planning object that represents a given land use and includes at least one display characteristic and a first embedded behavior, wherein the vector geometry, once associated with the land planning object, inherits the at least one display characteristic and the first embedded behavior from the land planning object, and wherein the bounded region represents a portion of the development site to be dedicated to the given land use;

determining that the vector geometry does not include any undesirable conditions by evaluating the first embedded behavior inherited from the land planning object;

generating a representation of the vector geometry according to the at least one display characteristic inherited from the land planning object; and updating the graphical display to include the representation of the vector geometry.

2. The method of claim 1, wherein the graphical display shows a net buildable area of the development site determined from geographic information system (GIS) data describing the development site and from one or more development constraints.

3. The method of claim 2, wherein one of the one or more development constraints specifies at least one of (i) a maximum slope that a given area of the development site may have to be included in the net buildable area, (ii) a project boundary surrounding the development site, and (iii) a minimum buffer surrounding a region of the development site excluded from the net buildable area.

4. The method of claim 1, wherein geographic information system (GIS) data describes geographical and topographical characteristics of the development site, and wherein the method further comprises:

evaluating the bounded region to determine that the given land use is inconsistent with the geographical and topographical characteristics of the portion of the development site represented by the bounded region; and based on the geographical and topographical characteristics of the portion of the development site, suggesting, to the user, a different land use to which the portion of the development site represented by the bounded region can be dedicated.

5. The method of claim 1, wherein the raster input is received from a touch sensitive display configured to present the graphical display of the development site to the user.

6. The method of claim 1, wherein the representation of the vector geometry includes one or more selectable grips and wherein the method further comprises:

receiving a selection of one of the selectable grips;
receiving user input dragging the selected grip from an initial position to a second position;
updating the vector geometry based on the user input dragging the selected grip; and
updating the land planning object associated with the vector geometry.

7. The method of claim 1, wherein the first embedded behavior is associated with a first phase of a land planning process associated with the development site.

8. A computer-readable storage medium storing instructions that when executed by a processor cause the processor to perform an operation for processing raster input supplied to a land planning tool by performing the steps of:

generating a graphical display representing a development site;
presenting the graphical display of the development site to a user;
receiving the raster input, wherein the raster input is drawn on the graphical display to specify a bounded region of the development site;
generating vector geometry based on the raster input, wherein the vector geometry describes a position and a shape of the bounded region of the development site;
associating the vector geometry with a land planning object that represents a given land use and includes at least one display characteristic and first embedded behavior, wherein the vector geometry, once associated with the land planning object, inherits the at least one display characteristic and the first embedded behavior from the land planning object, and wherein the bounded region represents a portion of the development site to be dedicated to the given land use;
determining that the vector geometry does not include any undesirable conditions by evaluating the first embedded behavior inherited from the land planning object;
generating a representation of the vector geometry according to the at least one display characteristic inherited from the land planning object; and
updating the graphical display to include the representation of the vector geometry.

9. The computer-readable storage medium of claim 8, wherein the graphical display shows a net buildable area of the development site determined from geographic information system (GIS) data describing the development site and from one or more development constraints.

10. The computer-readable storage medium of claim 9, wherein one of the one or more development constraints specifies at least one of (i) a maximum slope that a given area of the development site may have to be included in the net buildable area, (ii) a project boundary surrounding the development site, and (iii) a minimum buffer surrounding a region of the development site excluded from the net buildable area.

11. The computer-readable storage medium of claim 8, wherein geographic information system (GIS) data describes geographical and topographical characteristics of the development site, and wherein the method further comprises:

evaluating the bounded region to determine that the given land use is inconsistent with the geographical and topographical characteristics of the portion of the development site represented by the bounded region; and based on the geographical and topographical characteristics of the portion of the development site, suggesting, to the user, a different land use to which the portion of the development site represented by the bounded region can be dedicated.

12. The computer-readable storage medium of claim 8, wherein the raster input is received from a touch sensitive display configured to present the graphical display of the development site to the user.

13. The computer-readable storage medium of claim 8, wherein the representation of the vector geometry includes one or more selectable grips and wherein the method further comprises:

receiving a selection of one of the selectable grips;
receiving user input dragging the selected grip from an initial position to a second position;
updating the vector geometry based on the user input dragging the selected grip; and
updating the land planning object associated with the vector geometry.

14. The computer readable medium of claim 8, wherein the first embedded behavior is associated with a first phase of a land planning process associated with the development site.

15. A method for processing raster input, comprising:
generating a graphical display representing a development site;
presenting the graphical display of the development site to a user; and
invoking a land planning tool configured to:
- receive the raster input, wherein the raster input is drawn on the graphical display to specify a bounded region of the development site;
- generate vector geometry based on the raster input, wherein the vector geometry describes a position and a shape of the bounded region of the development site;
- associate the vector geometry with a land planning object that represents a given land use and includes at least one display characteristic and first embedded behavior, wherein the vector geometry, once associated with the land planning object, inherits the at least one display characteristic and the first embedded behavior from the land planning object, and wherein the bounded region represents a portion of the development site to be dedicated to the given land use;
- determine that the vector geometry does not include any undesirable conditions by evaluating the first embedded behavior inherited from the land planning object;
- generate a representation of the vector geometry according to the at least one display characteristic inherited from the land planning object; and
- update the graphical display to include the representation of the vector geometry.

16. The method of claim 15, wherein the graphical display shows a net buildable area of the development site determined from geographic information system (GIS) data describing the development site and from one or more development constraints.

17. The method of claim 16, wherein one of the one or more development constraints specifies at least one of (i) a maximum slope that a given area of the development site may have to be included in the net buildable area, (ii) a project boundary surrounding the development site, and (iii) a minimum buffer surrounding a region of the development site excluded from the net buildable area.

18. The method of claim 15, wherein geographic information system (GIS) data describes geographical and topographical characteristics of the development site, and wherein the land planning tool is further configured to:
- evaluate the bounded region to determine that the given land use is inconsistent with the geographical and topographical characteristics of the portion of the development site represented by the bounded region; and
- based on the geographical and topographical characteristics of the portion of the development site, suggest, to the user, a different land use to which the portion of the development site represented by the bounded region can be dedicated.

19. The method of claim 15, wherein the raster input is received from a touch sensitive display configured to present the graphical display of the development site to the user.

20. The method of claim 15, wherein the representation of the vector geometry includes one or more selectable grips and wherein the land planning tool is further configured to:
- receive a selection of one of the selectable grips;
- receive user input dragging the selected grip from an initial position to a second position;
- update the vector geometry based on the user input dragging the selected grip; and
- update the land planning object associated with the vector geometry.

21. The method of claim 15, wherein the first embedded behavior is associated with a first phase of a land planning process associated with the development site.

* * * * *